US011948739B2

(12) United States Patent
Marchais et al.

(10) Patent No.: US 11,948,739 B2
(45) Date of Patent: Apr. 2, 2024

(54) MINIMIZING TRANSIENT ARTIFACT OF POSITION ESTIMATE IN INDUCTIVELY-SENSED ELECTROMAGNETIC ACTUATOR SYSTEM WITH SHARED INDUCTIVE SENSOR

(71) Applicant: Cirrus Logic International Semiconductor Ltd., Edinburgh (GB)

(72) Inventors: Emmanuel A. Marchais, Dripping Springs, TX (US); Tejasvi Das, Austin, TX (US); Siddharth Maru, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 275 days.

(21) Appl. No.: 17/568,248

(22) Filed: Jan. 4, 2022

(65) Prior Publication Data

US 2022/0359113 A1 Nov. 10, 2022

Related U.S. Application Data

(60) Provisional application No. 63/186,169, filed on May 9, 2021.

(51) Int. Cl.
*H01F 7/18* (2006.01)

(52) U.S. Cl.
CPC ..... *H01F 7/1844* (2013.01); *H01F 2007/185* (2013.01)

(58) Field of Classification Search
CPC ......................... H01F 7/1844; H01F 2007/185
See application file for complete search history.

(56) References Cited

U.S. PATENT DOCUMENTS 10,726,683 B1 * 7/2020 Marchais ................. G08B 3/10
2008/0191826 A1 * 8/2008 Keller ........................ F01L 9/20 335/268

(Continued)

FOREIGN PATENT DOCUMENTS

FR 2934413 A1 * 1/2010 ........... H01F 7/1844
GB 2499026 A 8/2013

OTHER PUBLICATIONS

International Search Report and Written Opinion of the International Searching Authority, International Application No. PCT/US2022/020022, dated Jun. 28, 2022.

*Primary Examiner* — Christopher E Mahoney
(74) *Attorney, Agent, or Firm* — Jackson Walker L.L.P.

(57) ABSTRACT

A system may include an electromagnetic actuator, a first coil configured to drive mechanical displacement of the electromagnetic actuator, a second coil configured to drive mechanical displacement of the electromagnetic actuator, and an inductance sensing subsystem having an inductance sensing path coupled to the first coil and the second coil. The inductance sensing subsystem may be configured to select one of the first coil and the second coil for driving mechanical displacement of the electromagnetic actuator, select the other of the first coil and the second coil as a sensing coil for sensing displacement of the electromagnetic actuator, determine a displacement of the electromagnetic actuator based on a measurement of estimated inductance of the sensing coil, and when switching selection of the sensing coil from the first coil to the second coil determine the displacement of the first coil based on a measured inductance of the first coil at approximately the time of switching selection, estimate state variables of the inductance sensing path to be used with the second coil based on the displacement, and apply the state variables to the inductance sensing path after (Continued)

300 switching selection of the sensing coil from the first coil to the second coil.

15 Claims, 3 Drawing Sheets

(56) References Cited

U.S. PATENT DOCUMENTS

| | | | |
|---|---|---|---|
| 2017/0256145 A1 | 9/2017 | Macours et al. | |
| 2018/0321748 A1 | 11/2018 | Rao et al. | |
| 2019/0103829 A1 | 4/2019 | Vasudevan et al. | |
| 2021/0099062 A1* | 4/2021 | Tarelli | H02P 25/032 |

* cited by examiner

MINIMIZING TRANSIENT ARTIFACT OF POSITION ESTIMATE IN INDUCTIVELY-SENSED ELECTROMAGNETIC ACTUATOR SYSTEM WITH SHARED INDUCTIVE SENSOR

RELATED APPLICATION

The present disclosure claims priority to U.S. Provisional Patent Application Ser. No. 63/186,169, filed May 9, 2021, which is incorporated by reference herein in its entirety.

FIELD OF DISCLOSURE

The present disclosure relates in general to methods, apparatuses, or implementations for monitoring loads with complex impedances. Embodiments set forth herein may also disclose improvements to how a displacement of a haptic actuator or other electromechanical load may be sensed and/or improvements to how a complex impedance is monitored.

BACKGROUND

Vibro-haptic transducers, for example linear resonant actuators (LRAs), are widely used in portable devices such as mobile phones to generate vibrational feedback to a user. Vibro-haptic feedback in various forms creates different feelings of touch to a user's skin and may play increasing roles in human-machine interactions for modern devices.

An LRA may be modelled as a mass-spring electro-mechanical vibration system. When driven with appropriately designed or controlled driving signals, an LRA may generate certain desired forms of vibrations. For example, a sharp and clear-cut vibration pattern on a user's finger may be used to create a sensation that mimics a mechanical button click. This clear-cut vibration may then be used as a virtual switch to replace mechanical buttons.

FIG. 1 illustrates an example of a vibro-haptic system in a device 100. Device 100 may comprise a controller 101 configured to control a signal applied to an amplifier 102. Amplifier 102 may then drive a vibrational actuator (e.g., haptic transducer) 103 based on the signal. Controller 101 may be triggered by a trigger to output the signal. The trigger may, for example, comprise a pressure or force sensor on a screen or virtual button of device 100.

Among the various forms of vibro-haptic feedback, tonal vibrations of sustained duration may play an important role to notify the user of the device of certain predefined events, such as incoming calls or messages, emergency alerts, and timer warnings, etc. In order to generate tonal vibration notifications efficiently, it may be desirable to operate the haptic actuator at its resonance frequency.

The resonance frequency $f_0$ of a haptic transducer may be approximately estimated as:

$$f_0 = \frac{1}{2\pi\sqrt{CM}} \tag{1}$$

where C is the compliance of the spring system, and M is the equivalent moving mass, which may be determined based on both the actual moving part in the haptic transducer and the mass of the portable device holding the haptic transducer.

Due to sample-to-sample variations in individual haptic transducers, mobile device assembly variations, temporal component changes caused by aging, and use conditions such as various different strengths of a user gripping the device, the vibration resonance of the haptic transducer may vary from time to time.

FIG. 2 illustrates an example of a linear resonant actuator (LRA) modelled as a linear system. LRAs are non-linear components that may behave differently depending on, for example, the voltage levels applied, the operating temperature, and the frequency of operation. However, these components may be modelled as linear components within certain conditions. In this example, the LRA is modelled as a third order system having electrical and mechanical elements. In particular, Re and Le are the DC resistance and coil inductance of the coil-magnet system, respectively; and Bl is the magnetic force factor of the coil. The driving amplifier outputs the voltage waveform V(t) with the output impedance Ro. The terminal voltage $V_T(t)$ may be sensed across the terminals of the haptic transducer. The mass-spring system 201 moves with velocity u(t).

A haptic system may require precise control of movements of the haptic transducer. Such control may rely on the magnetic force factor Bl, which may also be known as the electromagnetic transfer function of the haptic transducer. In an ideal case, magnetic force factor Bl can be given by the product B·l, where B is magnetic flux density and l is a total length of electrical conductor within a magnetic field. Both magnetic flux density B and length l should remain constant in an ideal case with motion occurring along a single axis.

In generating haptic vibration, an LRA may undergo displacement. In order to protect an LRA from damage, such displacement may be limited. Accordingly, accurate measurement of displacement may be crucial in optimizing LRA displacement protection algorithms Accurate measurement of displacement may also enable increased drive levels of the LRA. While existing approaches measure displacement, such approaches have disadvantages. For example, displacement may be measured using a Hall sensor, but Hall sensors are often costly to implement.

SUMMARY

In accordance with the teachings of the present disclosure, the disadvantages and problems associated with existing approaches for monitoring a complex impedance may be reduced or eliminated.

In accordance with embodiments of the present disclosure, a system may include an electromagnetic actuator, a first coil configured to drive mechanical displacement of the electromagnetic actuator, a second coil configured to drive mechanical displacement of the electromagnetic actuator, and an inductance sensing subsystem having an inductance sensing path coupled to the first coil and the second coil. The inductance sensing subsystem may be configured to select one of the first coil and the second coil for driving mechanical displacement of the electromagnetic actuator, select the other of the first coil and the second coil as a sensing coil for sensing displacement of the electromagnetic actuator, determine a displacement of the electromagnetic actuator based on a measurement of estimated inductance of the sensing coil, and when switching selection of the sensing coil from the first coil to the second coil, determine the displacement of the first coil based on a measured inductance of the first coil at approximately the time of switching selection, estimate state variables of the inductance sensing path to be used with the second coil based on the displacement, and apply the state variables to the inductance sensing path after switching selection of the sensing coil from the first coil to the second coil.

In accordance with these and other embodiments of the present disclosure, a method may include selecting one of a first coil and a second coil for driving mechanical displacement of an electromagnetic actuator, wherein the first coil is configured to drive mechanical displacement of the electromagnetic actuator and the second coil is configured to drive mechanical displacement of the electromagnetic actuator. The method may also include selecting the other of the first coil and the second coil as a sensing coil for sensing displacement of the electromagnetic actuator. The method may further include determining a displacement of the electromagnetic actuator based on a measurement of estimated inductance of the sensing coil. The method may additionally include, when switching selection of the sensing coil from the first coil to the second coil, determining the displacement of the first coil based on a measured inductance of the first coil at approximately the time of switching selection, estimating state variables of the inductance sensing path to be used with the second coil based on the displacement, and applying the state variables to the inductance sensing path after switching selection of the sensing coil from the first coil to the second coil.

In accordance with these and other embodiments of the present disclosure, a processing subsystem may include a first output configured to drive a first coil configured to drive mechanical displacement of the electromagnetic actuator, a second output configured to drive a second coil configured to drive mechanical displacement of the electromagnetic actuator, and an inductance sensing subsystem coupled to the first coil and the second coil. The inductance sensing subsystem may be configured to select one of the first coil and the second coil for driving mechanical displacement of the electromagnetic actuator, select the other of the first coil and the second coil as a sensing coil for sensing displacement of the electromagnetic actuator, determine a displacement of the electromagnetic actuator based on a measurement of estimated inductance of the sensing coil, and when switching selection of the sensing coil from the first coil to the second coil, determine the displacement of the first coil based on a measured inductance of the first coil at approximately the time of switching selection, estimate state variables of the inductance sensing path to be used with the second coil based on the displacement, and apply the state variables to the inductance sensing path after switching selection of the sensing coil from the first coil to the second coil.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
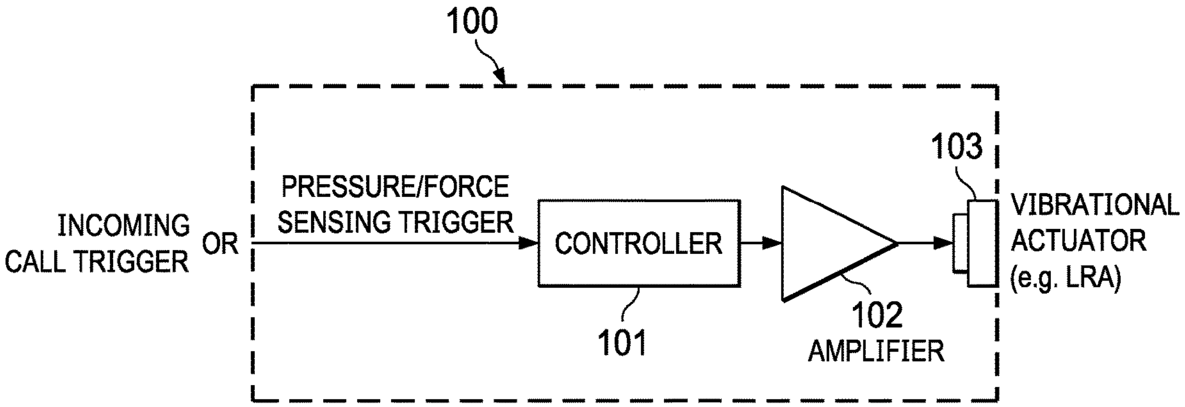
FIG. 1 (PRIOR ART)
FIG. 1 illustrates an example of a vibro-haptic system in a device, as is known in the art.
Figure 2:
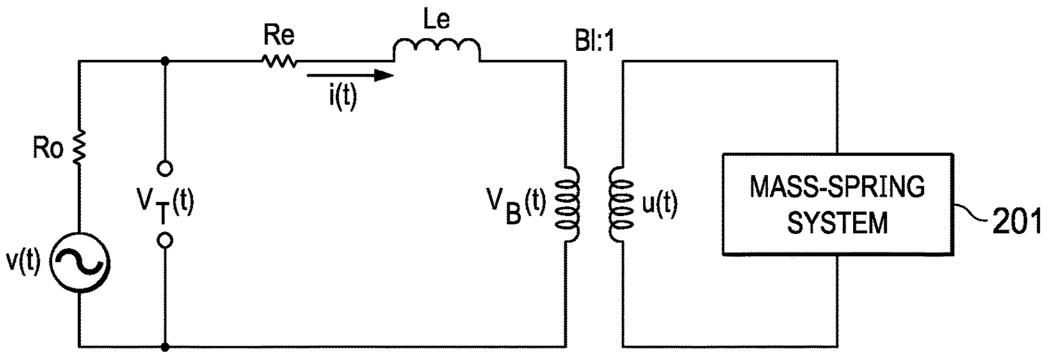
FIG. 2 (PRIOR ART)
FIG. 2 illustrates an example of a Linear Resonant Actuator (LRA) modelled as a linear system, as is known in the art.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection-type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively, an electronic device may have a connector, e.g., a socket, for making a removable mating connection with a corresponding connector of an accessory apparatus, and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal may generally be an analog time varying voltage signal, for example, a time varying waveform.

To accurately sense displacement of an electromagnetic load, methods and systems of the present disclosure may determine an inductance of the electromagnetic load, and then convert the inductance to a position signal, as described in greater detail below. Further, to measure inductance of an electromagnetic load, methods and systems of the present disclosure may utilize either a phase measurement approach and/or a high-frequency pilot-tone driven approach, as also described in greater detail below.

To illustrate, an electromagnetic load may be driven by a driving signal V(t) to generate a sensed terminal voltage $V_T(t)$ across a coil of the electromagnetic load. Sensed terminal voltage $V_T(t)$ may be given by:

$$V_T(t)=Z_{COIL}I(t)+V_B(t)$$

wherein I(t) is a sensed current through the electromagnetic load, $Z_{COIL}$, is an impedance of the electromagnetic load, and $V_B(t)$ is the back-electromotive force (back-EMF) associated with the electromagnetic load.

As used herein, to "drive" an electromagnetic load means to generate and communicate a driving signal to the electromagnetic load to cause displacement of a movable mass of the electromagnetic load. Further, to "drive" an electromagnetic load may also mean driving of a pilot signal or other test signal to the electromagnetic load from which electrical parameters of the electromagnetic load may be measured.

Because back-EMF voltage $V_B(t)$ may be proportional to velocity of the moving mass of the electromagnetic load, back-EMF voltage $V_B(t)$ may in turn provide an estimate of such velocity. Thus, velocity of the moving mass may be recovered from sensed terminal voltage $V_T(t)$ and sensed current I(t) provided that either: (a) sensed current I(t) is equal to zero, in which case $V_B=V_T$; or (b) coil impedance $Z_{COIL}$ is known or is accurately estimated.

Position of the moving mass may be related to a coil inductance $L_{COIL}$, of the electromagnetic load. At high frequencies significantly above the bandwidth of the electromagnetic load, back-EMF voltage $V_B(t)$ may become negligible and inductance may dominate the coil impedance $Z_{COIL}$ Sensed terminal voltage $V_{T@HF}(t)$ at high frequencies may be estimated by:

$$V_{T@HF}(t)=Z_{COIL}I_{@HF}(t)$$

An inductance component of coil impedance $Z_{COIL}$, may be indicative of a position or a displacement of the moving mass of the electromagnetic load. To illustrate, such inductance may be a nominal value when the moving mass is at rest. When the mass moves, the magnetic field strength may be modulated by the position of the mass which leads to a small alternating-current (AC) modulation signal of the inductance that is a function of the mass position.

Hence, at high frequencies, the position of the moving mass of the electromagnetic load may be recovered from sensed terminal voltage $V_T(t)$ and sensed current I(t) by: (a) estimating the coil impedance at high frequency as $Z_{COIL@HF}\cong R_{@HF}+L_{@HF}\cdot s$, where $R_{@HF}$ is the resistive part of the coil impedance at high frequency, $L_{@HF}$ is the coil inductance at high frequency, and s is the Laplace transform; and (b) converting the measured inductance to a position signal. Velocity and/or position may be used to control vibration of the moving mass of the electromagnetic load.

Figure 3:
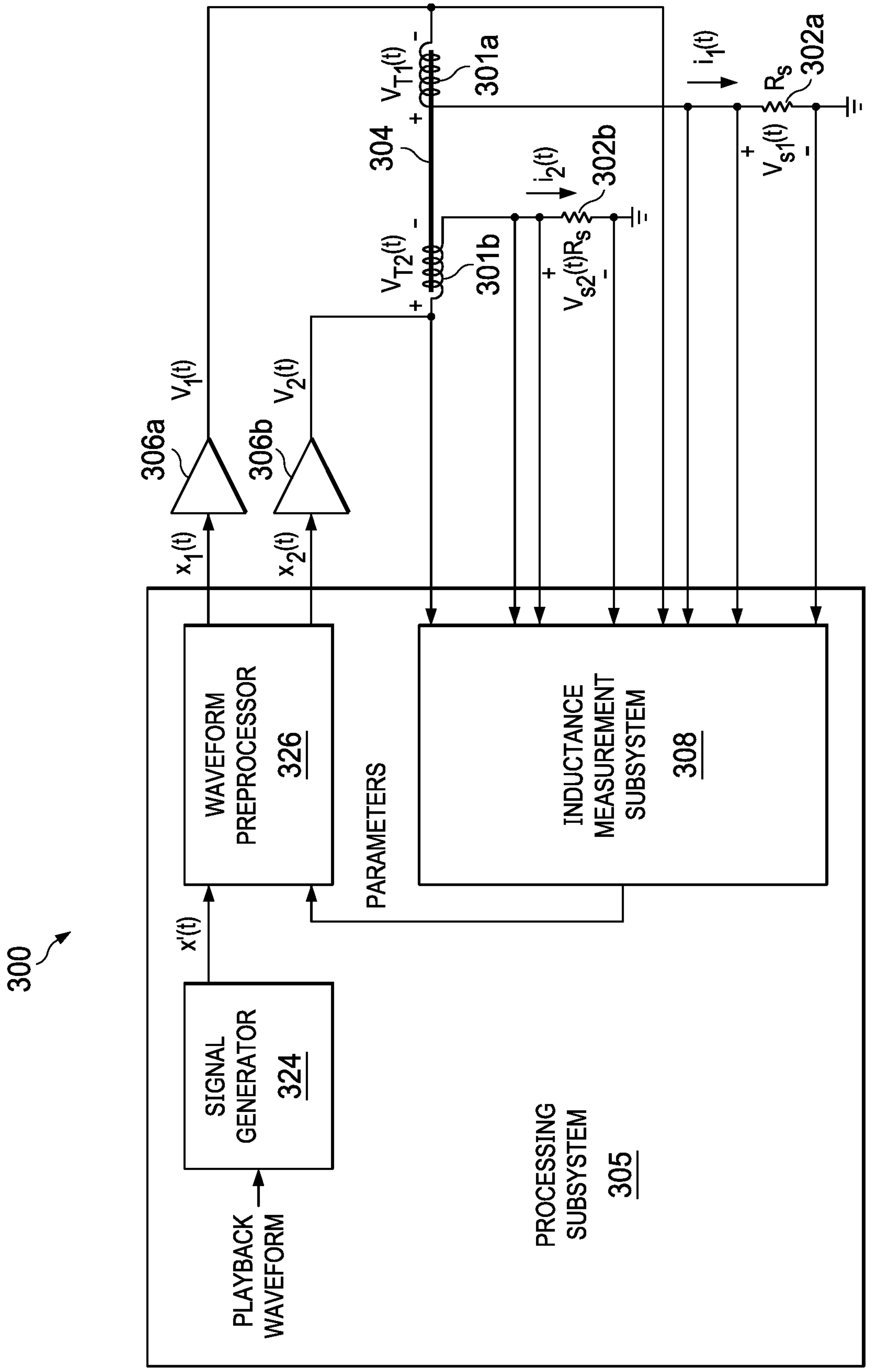
FIG. 3 illustrates selected components of an example host device, in accordance with embodiments of the present disclosure.

FIG. 3 illustrates selected components of an example host device 300 having an electromagnetic actuator 304. Host device 300 may include, without limitation, a mobile device, home application, vehicle, and/or any other system, device, or apparatus that includes a human-machine interface. Electromagnetic actuator 304 may include any suitable load with a complex impedance, including without limitation a haptic transducer, a loudspeaker, a microspeaker, a voice-coil actuator, a solenoid, or other suitable transducer.

In operation, a signal generator 324 of a processing subsystem 305 of host device 300 may generate a raw transducer driving signal x' (t) (which, in some embodiments, may be a waveform signal, such as a haptic waveform signal or audio signal). Raw transducer driving signal x' (t) may be generated based on a desired playback waveform received by signal generator 324.

Raw transducer driving signal x' (t) may be received by waveform preprocessor 326 which may modify raw transducer driving signal x'(t) based on parameters received from inductance measurement subsystem 308 and/or based on any other factor in order to generate processed transducer driving signals $x_1(t)$ and $x_2(t)$. For example, such modification may include control of processed transducer driving signals $x_1(t)$ and $x_2(t)$ in order to prevent overexcursion of electromagnetic actuator 304 that could lead to damage.

Processed transducer driving signal $x_1(t)$ may in turn be amplified by amplifier 306*a* to generate a driving signal $V_1(t)$ for driving electromagnetic load 301*a*. Similarly, processed transducer driving signal $x_2(t)$ may in turn be amplified by amplifier 306*b* to generate a driving signal $V_2(t)$ for driving electromagnetic load 301*b*. Accordingly, host device 300 may operate such that electromagnetic actuator 304 is alternatingly driven by driving signal $V_1(t)$ and driving signal $V_2(t)$. Accordingly, host device 300 may operate in a series of alternating phases: a first phase in which driving signal $V_1(t)$ driven to electromagnetic load 301*a* drives electromagnetic actuator 304 and electromagnetic load 301*b* is used to measure a displacement of electromagnetic actuator 304, and a second phase in which driving signal $V_2(t)$ driven to electromagnetic load 301*b* drives electromagnetic actuator 304 and electromagnetic load 301*a* is used to measure a displacement of electromagnetic actuator 304.

A sensed terminal voltage $V_{T1}(t)$ of electromagnetic load 301*a* may be sensed by inductance measurement subsystem 308 (e.g., using a volt-meter). Similarly, sensed current $I_1(t)$ through electromagnetic load 301*a* may be sensed by inductance measurement subsystem 308. For example, current $I_1(t)$ may be sensed by a sense voltage $V_{S1}(t)$ across a shunt resistor 302*a* having resistance $R_s$ coupled to a terminal of electromagnetic load 301*a*.

Likewise, a sensed terminal voltage $V_{T2}(t)$ of electromagnetic load 301*b* may be sensed by inductance measurement subsystem 308 (e.g., using a volt-meter). Similarly, sensed current $I_2(t)$ through electromagnetic load 301*b* may be sensed by inductance measurement subsystem 308. For example, current $I_2(t)$ may be sensed by a sense voltage $V_{S2}(t)$ across a shunt resistor 302*b* having resistance $R_s$ coupled to a terminal of electromagnetic load 301*b*.

As shown in FIG. 3, and as described in greater detail below, processing subsystem 305 may include an inductance measurement subsystem 308 that may estimate respective coil inductances $L_{COIL}$ of electromagnetic loads 301*a* and 301*b*. From such estimated coil inductance $L_{COIL}$, inductance measurement subsystem 308 may determine a displacement associated with electromagnetic load 304. Based on such determined displacement, inductance measurement subsystem 308 may communicate one or more parameters to waveform preprocessor 326 (including, without limitation, the value of such displacement), which may cause waveform preprocessor 326 to modify raw transducer driving signal x'(t). In some embodiments, such displacement may also be indicative of a human interaction (e.g., applied force) to electromagnetic actuator 304.

In operation, to estimate impedance $Z_{COIL}$, inductance measurement subsystem 308 may measure impedance in any suitable manner, including without limitation using the approaches set forth in U.S. patent application Ser. No. 17/497,110 filed Oct. 8, 2021, which is incorporated in its entirety by reference herein.

As a particular example, in order to estimate coil impedance $Z_{COIL}$ waveform preprocessor 326 may generate a processed transducer driving signal $x_1(t)$ or $x_2(t)$ (depending on which electromagnetic coil 301 is the actuating coil used to drive movement of electromagnetic load 304 and which electromagnetic coil 301 is used for sensing) comprising a high-frequency stimulus for driving the sensing coil. Such high-frequency stimulus may be a tone or a carrier signal (e.g., pulse-width modulation carrier for an amplifier 306). In response, inductance measurement system 308 may measure inductance of the sensing coil.

Figure 4:
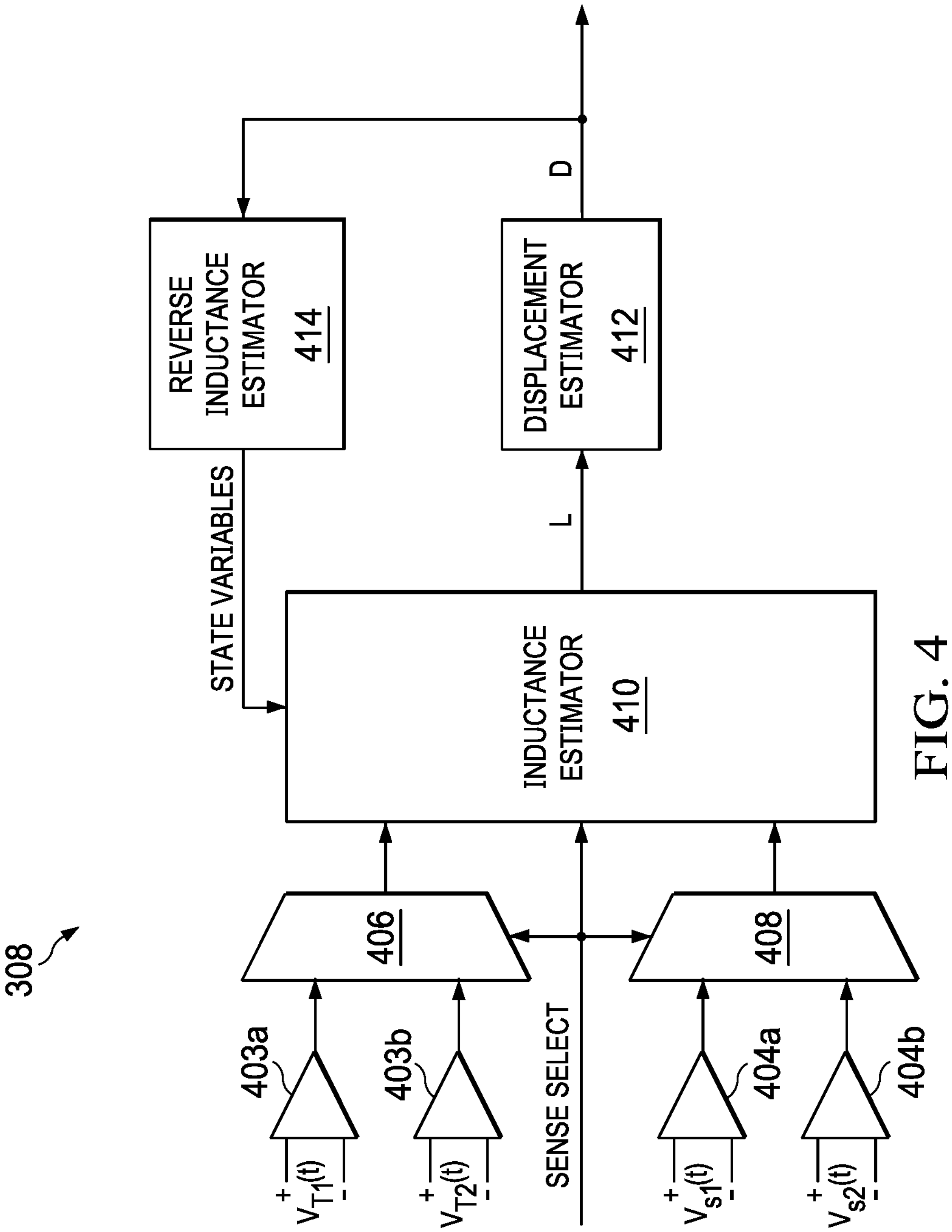
FIG. 4 illustrates selected components of an example inductance measurement subsystem, in accordance with embodiments of the present disclosure.

FIG. 4 illustrates selected components of an example inductance measurement subsystem 308, in accordance with embodiments of the present disclosure. As shown in FIG. 4, sensed terminal voltage $V_{T1}(t)$ of electromagnetic load 301*a* may be converted to a digital representation by an analog-to-digital converter (ADC) 403*a*. Similarly, sensed voltage $V_{S1}(t)$, indicative of current $I_1(t)$, may be converted to a digital representation by an ADC 404*a*. Likewise, sensed terminal voltage $V_{T2}(t)$ of electromagnetic load 301*b* may converted to a digital representation by an ADC 403*b* and sensed voltage $V_{S2}(t)$, indicative of current $I_2(t)$, may be converted to a digital representation by an ADC 404*b*.

As further shown in FIG. 4, the digital representations of sensed terminal voltage $V_{T1}(t)$ and sensed terminal voltage $V_{T2}(t)$ may be received by a multiplexer 406, which may select one of such digital representations based on a control signal SENSE_SELECT. Control signal SENSE_SELECT may indicate whether host device 300 is in a first phase (e.g., electromagnetic load 301*a* is used to drive electromagnetic actuator 304 and electromagnetic load 301*b* is used for measurement) or a second phase (e.g., electromagnetic load 301*b* is used to drive electromagnetic actuator 304 and electromagnetic load 301*a* is used for measurement). Accordingly, multiplexer 406 may select the digital representation of the sensed terminal voltage of the electromagnetic load actively being used to perform sensing. In some embodiments, multiplexer 406 may periodically duty cycle selection between electromagnetic load 301*a* and electromagnetic load 301*b*.

Similarly, the digital representations of sensed voltage $V_{S1}(t)$ and sensed voltage $V_{S2}(t)$ may be received by a multiplexer 408, which may select one of such digital representations based on a control signal SENSE_SELECT. Accordingly, multiplexer 408 will select the digital representation of the current through the electromagnetic load actively being used to perform sensing.

Although FIG. 4 contemplates duty-cycles selection between processing sensed voltage $V_{S1}(t)$ and sensed voltage $V_{S2}(t)$ and between processing sensed terminal voltage $V_{T1}(t)$ and sensed terminal voltage $V_{T2}(t)$, in some embodiments, inductance measurement subsystem 308 may perform parallel estimates of inductance based on sensed voltage $V_{S1}(t)$, sensed voltage $V_{S2}(t)$, sensed terminal voltage $V_{T1}(t)$, and sensed terminal voltage $V_{T2}(t)$.

Based on the selected measured current and voltage signals, an inductance estimator 410 may estimate inductance L of the electromagnetic load actively being used to perform sensing. For example, inductance estimator 410 may calculate inductance based on magnitudes of the selected measured current and voltage signals and/or a phase difference between the selected measured current and voltage signals. As mentioned above, inductance estimator 410 may estimate impedance in any suitable manner, including without limitation using the approaches set forth in U.S. patent application Ser. No. 17/497,110. Based on the estimated inductance L, a displacement estimator 412 may estimate a displacement D of electromagnetic actuator 304.

In operation, inductance measurement subsystem 308 may experience transient effects when switching between the electromagnetic loads actively being used to perform sensing, as indicated by a change of control signal SENSE_SELECT. Such transient effects may occur due to path delays present in inductance estimator 410, including one or more filters (e.g., low-pass filters) used within inductance estimator 410 to smooth and/or otherwise condition estimation of inductance L. To illustrate, at the beginning of a phase, immediately after control signal SENSE_SELECT changes, the valid displacement information may be delayed from the start of the phase until the one or more filters of inductance estimator 410 have fully settled. This may create a dead-zone in which no displacement information is valid around the phase boundaries. For example, when the electromagnetic load actively being used to perform sensing switches from electromagnetic load 301*a* to electromagnetic load 301*b*, the sensed inductance value may abruptly change which may cause filtering artifacts, in turn leading to distorted position estimation. Such delay may lead to latency between an event that triggers an actuation and the start of the actuation period. In some applications, such as where electromagnetic transducer 304 is a haptic actuator, it may be critical that latency be minimized to ensure the actuator response is perceived as a mechanical button response to a human interaction.

To reduce or eliminate such challenges, reverse inductance estimator 414 may be configured to receive the estimated displacement D from displacement estimator 412 and based thereon, calculate expected state variables (e.g., filter coefficients) associated with the sensing-inactive electromagnetic load (e.g., the electromagnetic load other than the electromagnetic load actively being used to perform sensing). Thus, displacement information estimated from the electromagnetic load actively being used to perform sensing prior to switching between phases may be used to estimate expected values of state variables of the inductance estimator 410 if the inactive load were hypothetically actively sensing. Accordingly, in response to switching of control signal SENSE_SELECT, inductance estimator 410 may update its state variables based on estimations from reverse inductance estimator 414, to reflect the then-current displacement estimate. Further, to reduce lag between a haptic or other triggering event and start of actuation, state variables of inductance estimator 410 may be updated to reflect the correct displacement estimate.

When actuation of electromagnetic actuator 304 is first triggered (e.g., from rest), the expected state variables may be preset based on an estimate of inductance of the electromagnetic load actively being used to perform sensing following such triggering assuming a displacement D at which electromagnetic actuator 304 is in its resting position.

Such update of state variables may serve to reduce or eliminate transient effects caused by differences between impedances of electromagnetic coil 301*a* and electromagnetic coil 301*b*. Accordingly, such differences in impedances may need to be calibrated with one another, to ensure the estimation performed by reverse inductance estimator 414 remains accurate and precise. In some embodiments, a calibration procedure may involve driving a high frequency sensing tone on both coils and estimating the high frequency inductance value on both coils simultaneously while also driving a direct current on one of the coils to displace the moving mass of electromagnetic coil 301 into a fixed displacement. An inductance versus displacement function of each electromagnetic coil 301 may then be inferred such that an impedance $L_1(x)$ of electromagnetic coil 301*a* may be mapped to an impedance $L_2(x)$ of electromagnetic coil 301*b* for a given displacement x of the moving mass away from its rest position.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:

an electromagnetic actuator;

a first coil configured to drive mechanical displacement of the electromagnetic actuator;

a second coil configured to drive mechanical displacement of the electromagnetic actuator; and an impedance sensing subsystem having an impedance sensing path coupled to the first coil and the second coil and configured to:

select one of the first coil and the second coil for driving mechanical displacement of the electromagnetic actuator;

select the other of the first coil and the second coil as a sensing coil for sensing displacement of the electromagnetic actuator;

determine a displacement of the electromagnetic actuator based on a measurement of estimated impedance of the sensing coil; and when switching selection of the sensing coil from the first coil to the second coil:

determine the displacement of the first coil based on a measured impedance of the first coil at approximately the time of switching selection;

estimate state variables of the impedance sensing path to be used with the second coil based on the displacement; and apply the state variables to the impedance sensing path after switching selection of the sensing coil from the first coil to the second coil.

2. The system of claim 1, the impedance sensing subsystem further configured to, during a period when the electromagnetic actuator is at rest:

measure impedance of each of the first coil and the second coil at a position of rest;

detect a difference in impedance between the first coil and the second coil at the position of rest; and calibrate determination of the displacement of the electromagnetic actuator based on the difference.

3. The system of claim 1, the impedance sensing subsystem further configured to duty cycle between:

selection of the first coil and the second coil as an actuating coil for driving mechanical displacement of the electromagnetic actuator; and selection of the first coil and the second coil as the sensing coil for sensing displacement of the electromagnetic actuator.

4. The system of claim 1, the impedance sensing subsystem further configured to calibrate the first coil and the second coil by:

driving a direct current to one of the first coil and the second coil in order to displace the electromagnetic actuator to a displacement from a position of rest;

sensing a first impedance of the first coil and a second impedance of the second coil;

determining an impedance versus displacement function for each of the first coil and the second coil; and mapping the displacement function of the first coil to the displacement function of the second coil.

5. The system of claim 1, wherein the estimated impedance is an estimated inductance.

6. A method comprising:

selecting one of a first coil and a second coil for driving mechanical displacement of an electromagnetic actuator, wherein the first coil is configured to drive mechanical displacement of the electromagnetic actuator and the second coil is configured to drive mechanical displacement of the electromagnetic actuator;

selecting the other of the first coil and the second coil as a sensing coil for sensing displacement of the electromagnetic actuator;

determining a displacement of the electromagnetic actuator based on a measurement of estimated impedance of the sensing coil; and when switching selection of the sensing coil from the first coil to the second coil:

determining the displacement of the first coil based on a measured impedance of the first coil at approximately the time of switching selection;

estimating state variables of the impedance sensing path to be used with the second coil based on the displacement; and applying the state variables to the impedance sensing path after switching selection of the sensing coil from the first coil to the second coil.

7. The method of claim 6, further comprising, during a period when the electromagnetic actuator is at rest:

measuring impedance of each of the first coil and the second coil at a position of rest;

detecting a difference in impedance between the first coil and the second coil at the position of rest; and calibrating determination of the displacement of the electromagnetic actuator based on the difference.

8. The method of claim 6, further comprising duty cycling between:

selection of the first coil and the second coil as an actuating coil for driving mechanical displacement of the electromagnetic actuator; and selection of the first coil and the second coil as the sensing coil for sensing displacement of the electromagnetic actuator.

9. The method of claim 6, further comprising calibrating the first coil and the second coil by:

driving a direct current to one of the first coil and the second coil in order to displace the electromagnetic actuator to a displacement from a position of rest;

sensing a first impedance of the first coil and a second impedance of the second coil;

determining an impedance versus displacement function for each of the first coil and the second coil; and mapping the displacement function of the first coil to the displacement function of the second coil.

10. The method of claim 6, wherein the estimated impedance is an estimated inductance.

11. A processing subsystem comprising:

a first output configured to drive a first coil configured to drive mechanical displacement of an electromagnetic actuator;

a second output configured to drive a second coil configured to drive mechanical displacement of the electromagnetic actuator; and an impedance sensing subsystem coupled to the first coil and the second coil and configured to:

select one of the first coil and the second coil for driving mechanical displacement of the electromagnetic actuator;

select the other of the first coil and the second coil as a sensing coil for sensing displacement of the electromagnetic actuator;

determine a displacement of the electromagnetic actuator based on a measurement of estimated impedance of the sensing coil; and when switching selection of the sensing coil from the first coil to the second coil:

determine the displacement of the first coil based on a measured impedance of the first coil at approximately the time of switching selection;

estimate state variables of the impedance sensing path to be used with the second coil based on the displacement; and apply the state variables to the impedance sensing path after switching selection of the sensing coil from the first coil to the second coil.

12. The processing subsystem of claim 11 the impedance sensing subsystem further configured to, during a period when the electromagnetic actuator is at rest: measure impedance of each of the first coil and the second coil at a position of rest; detect a difference in impedance between the first coil and the second coil at the position of rest; and calibrate determination of the displacement of the electromagnetic actuator based on the difference.

13. The processing subsystem of claim 11, the impedance sensing subsystem further configured to duty cycle between:

selection of the first coil and the second coil as an actuating coil for driving mechanical displacement of the electromagnetic actuator; and selection of the first coil and the second coil as the sensing coil for sensing displacement of the electromagnetic actuator.

14. The processing subsystem of claim 11, the impedance sensing subsystem further configured to calibrate the first coil and the second coil by:

driving a direct current to one of the first coil and the second coil in order to displace the electromagnetic actuator to a displacement from a position of rest;

sensing a first impedance of the first coil and a second impedance of the second coil;

determining an impedance versus displacement function for each of the first coil and the second coil; and mapping the displacement function of the first coil to the displacement function of the second coil.

15. The processing subsystem of claim 11, wherein the estimated impedance is an estimated inductance.

* * * * *